(12) United States Patent
Wang et al.

(10) Patent No.: US 10,659,556 B2
(45) Date of Patent: May 19, 2020

(54) PROGRESSIVE HYBRID WEB APPLICATION

(71) Applicant: SAP SE, Walldorf (DE)

(72) Inventors: Nathan Wang, Port Coquitlam (CA); Walter Mak, North Vancouver (CA); Michael Tsz Hong Sung, Richmond (CA); Edward Chao, Vancouver (CA)

(73) Assignee: SAP SE, Walldorf (DE)

( * ) Notice: Subject to any disclaimer, the term of this patent is extended or adjusted under 35 U.S.C. 154(b) by 123 days.

(21) Appl. No.: 15/657,290

(22) Filed: Jul. 24, 2017

(65) Prior Publication Data

US 2018/0338015 A1  Nov. 22, 2018

Related U.S. Application Data

(60) Provisional application No. 62/506,747, filed on May 16, 2017.

(51) Int. Cl.
*H04L 29/08* (2006.01)
*G06F 16/957* (2019.01)

(52) U.S. Cl.
CPC ...... *H04L 67/2847* (2013.01); *G06F 16/9574* (2019.01); *H04L 67/02* (2013.01)

(58) Field of Classification Search
CPC . H04L 67/2847; H04L 67/02; H04L 67/2842; H04L 67/42; H04L 67/22; H04L 12/12; G06F 16/9574; G06F 15/167; G06F 1/3231; G06F 1/3278; G06F 1/3287; Y02D 10/157; H04W 52/00; H04W 52/02; H04W 52/0219; H04W 52/0222; H04W 52/0229; H04W 52/0235; H04W 52/0254; H04W 52/0258; H04W 52/0261
See application file for complete search history.

(56) References Cited

U.S. PATENT DOCUMENTS

| | | | | |
|---|---|---|---|---|
| 8,447,951 | B2 * | 5/2013 | Chang | G06F 12/109 711/207 |
| 9,026,608 | B1 * | 5/2015 | Goldband | G06F 8/35 709/217 |
| 9,064,011 | B2 * | 6/2015 | Maharajh | G06Q 10/10 |
| 9,509,764 | B1 * | 11/2016 | Kolam | H04L 67/2852 |
| 2005/0114509 | A1 * | 5/2005 | Dahlman | H04L 63/0281 709/225 |

(Continued)

*Primary Examiner* — Todd L Barker
(74) *Attorney, Agent, or Firm* — Buckley, Maschoff & Talwalkar LLC (57) ABSTRACT

Provided is a system and method for managing a progressive hybrid web application by storing web content in a local cache. In an example, the method includes receiving a HTTP request from a web application executing on the user device, determining whether requested web content included in the HTTP request is stored in a local cache storage of the user device, and in response to determining the web content associated with the HTTP request is stored in the local cache storage, fetching the web content from the local cache storage and transferring the fetched web content to the web application. According to various aspects, the web content can be provided to the web application executing on the user device via the local cache even in a situation where the user device is not connected to the remote host server of the web application.

16 Claims, 9 Drawing Sheets

(56) References Cited

U.S. PATENT DOCUMENTS

| | | | |
|---|---|---|---|
| 2005/0138228 A1* | 6/2005 | Hornback, Jr. | H04L 12/1827 710/15 |
| 2006/0080352 A1* | 4/2006 | Boubez | H04L 63/08 |
| 2007/0260674 A1* | 11/2007 | Shenfield | H04L 67/26 709/203 |
| 2008/0082569 A1* | 4/2008 | Mansour | G06Q 10/10 |
| 2010/0138485 A1* | 6/2010 | Chow | H04L 67/2842 709/203 |
| 2012/0149352 A1* | 6/2012 | Backholm | H04W 52/0258 455/418 |
| 2014/0201258 A1* | 7/2014 | Jowett | H04L 67/02 709/203 |
| 2014/0298419 A1* | 10/2014 | Boubez | H04L 63/08 726/4 |
| 2014/0372515 A1* | 12/2014 | Chow | H04L 67/2842 709/203 |
| 2015/0019686 A1* | 1/2015 | Backholm | H04L 47/32 709/217 |
| 2015/0121413 A1* | 4/2015 | Ramakrishnan | H04W 4/70 725/25 |
| 2015/0222681 A1* | 8/2015 | Basile | H04L 65/60 709/219 |
| 2015/0271231 A1* | 9/2015 | Luby | H04L 65/4084 709/231 |
| 2016/0088067 A1* | 3/2016 | De Magalhaes | H04L 67/02 709/204 |
| 2017/0169031 A1* | 6/2017 | De Barros | H04L 67/02 |
| 2018/0307605 A1* | 10/2018 | Pack, III | H04L 67/2842 |

* cited by examiner

PROGRESSIVE HYBRID WEB APPLICATION

CROSS-REFERENCE TO RELATED APPLICATION(S)

This application claims the benefit under 35 USC § 119(e) of U.S. Provisional Patent Application No. 62/506,747, filed on May 16, 2017, which is incorporated herein by reference for all purposes.

BACKGROUND

A web application is a software application that is stored on a remote server and delivered over a network to a client through a web browser. Unlike traditional desktop (native) applications which are launched by a local operating system, a web application is stored on a host server connected to a public network such as the Internet and executed by any type of browser and type of computing device (e.g., Windows PC, Apple Mac, etc.) Examples of a web application include a message board, a social networking environment, a video player, and the like. A web application relieves the developer of the responsibility of building a client for a specific type of computer or a specific operating system. Also, the developer does not need to distribute software updates to users when the web application is updated but rather updates the application on the server which in-turn updates the web application for all users that have access to the updated version. Web application developers commonly use a combination of server-side script (ASP, PHP, etc.) and client-side script (HTML, Javascript, etc.) to develop the application. The client-side script may handle the presentation of the information while the server-side script may handle the storing and retrieving of the information to be presented.

While web applications offer several benefits, they do have some disadvantages compared to desktop applications. For example, because web applications typically do not run directly from the operating system of a client device, web applications have limited access to system resources, such as a central processing unit (CPU), memory, file system, and the like. As a result, high-end programs, such as video production and other media applications generally perform better as desktop applications. Web applications are also entirely dependent on the web browser. For example, if a web browser crashes or loses connection to the network, the web application may lose all progress that has been made during the session. Also, browser updates may cause incompatibilities with web applications, creating unexpected issues.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Web-based applications such as mobile applications often have web views included therein. A web view corresponds to an application running within a web browser. For example, a web browser may include a plurality of web views corresponding to a plurality of application tabs that are present within the web browser. Web pages may be loaded into a web view, displayed via a screen of a user device, and interacted with by the user of the web application. Typically, in order for the web view to obtain web content, a network call (e.g., an HTTP request) is made to a web server over a network such as the Internet. Here, the web browser including the web view may be referred to as a client and the web server hosting the web application may be referred to as a server within a client-server computing model.

However, network-connected devices such as mobile phones, tablets, laptops, and even desktop computers, often have unstable network connections due to various issues such as poor network quality, lack of availability, interference, and the like. Also, a significant number of network connections are not fast enough to provide data processing and downloading of web content at a rate that corresponds to un upload processing speed of a server hosting the web application. As a result, network connections can create significant latency and disconnections between the user device and the back-end server which can prevent web applications from successfully and/or efficiently loading web content.

The example embodiments provide a web application that can display and process interactive web content even in a situation where a network connection is down or is otherwise slow or inadequate. The web application may be a mobile application executing on a terminal or other computing device such as a mobile phone, a laptop, a tablet, a desktop, an appliance, and the like. According to various embodiments, the computing device includes a local storage such as a web-based cache that is managed by a local proxy (e.g., local cache proxy) of the computing device. When the web application needs web content, the web application may generate and send a network call to a web server hosting the web application. The local cache proxy can intercept these network calls received from the web application and which are intended for a remote web server, and delegate the tasks included in the network calls to be handled by the local cache storage.

For example, in response to a request for web content, the local cache proxy may attempt to acquire the requested web content from the local cache storage, if it exists. In some embodiments, the local cache proxy may also receive web content from the remote web server. Here, the local cache proxy may attempt to retrieve the web content at a later time (e.g., due to a network being down, etc.) In this example, the local cache proxy may compare the web content acquired from the local cache storage with web content from the remote server host of the web application or other externals sources (e.g., cloud, server, database, etc.) and trigger an update or a refresh of the local cache storage when the content on the host source has been updated to ensure that the local web cache has the most up-to-date data. Furthermore, the local cache proxy may refresh the web content executing on the web application.

Figure 1:
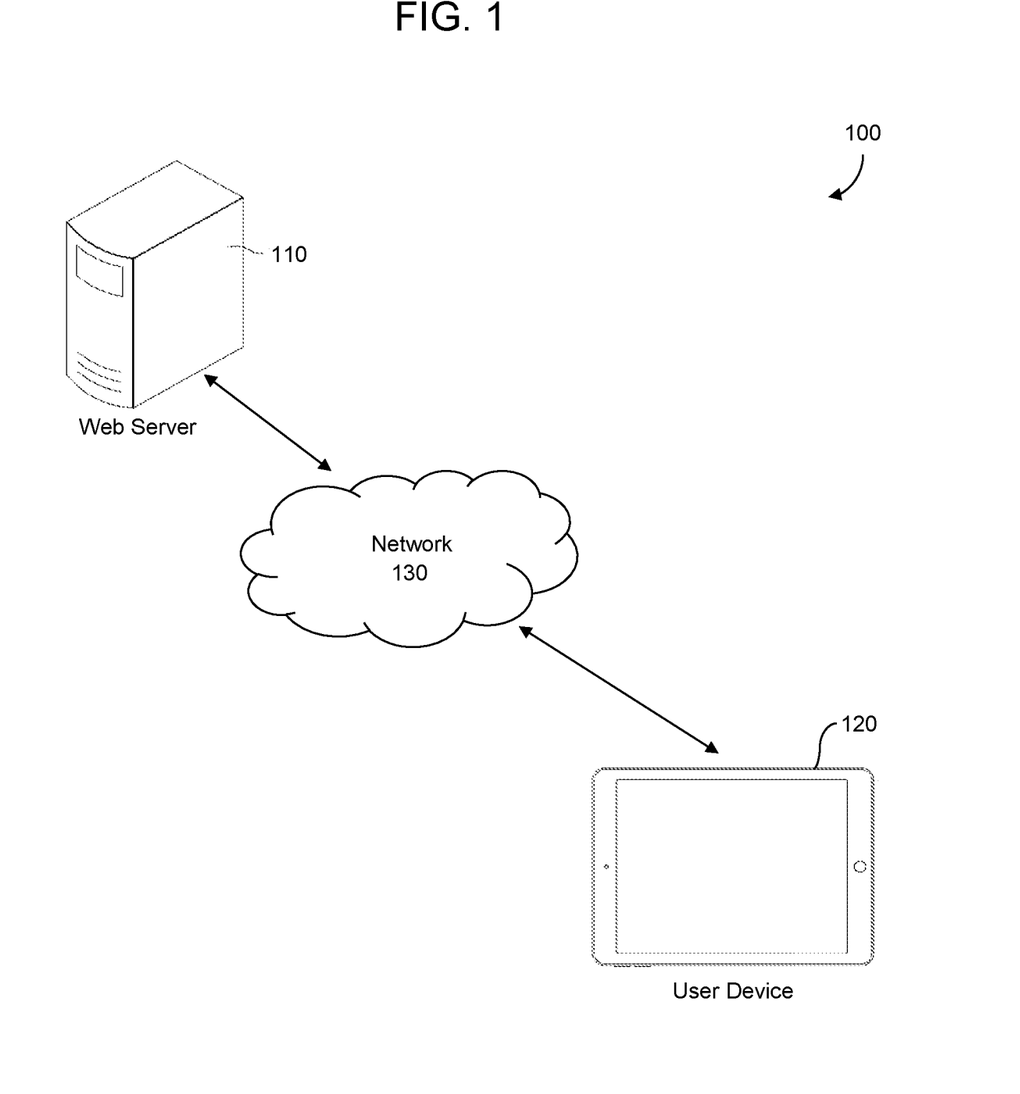
FIG. 1 is a diagram illustrating a system for executing a web application in accordance with an example embodiment.

FIG. 1 illustrates a system 100 for executing a progressive hybrid web application in accordance with an example embodiment. In this example, the system 100 includes a web server 110 and a user device 120 which are connected to each other via a network 130. The web server 110 may be a cloud platform, server, computer, and/or the like. The user device 120 may be a smartphone, a tablet, a desktop computer, an appliance, a kiosk, a gaming console, and the like. Both the web server 110 and the user device 120 may include network interfaces (e.g., wired, wireless, etc.) enabling the web server 110 and the user device 120 to connect to the network 130. In the examples herein, the web server 110 may host a web application capable of being accessed by devices such as user device 120 via the network. For example, the user device 120 may include a web browser (e.g., Internet Explorer, Chrome, Safari, etc.) capable of receiving a network address of the web application hosted by the web server 110. In response to receiving a request from the web application on the user device 120, the web server 110 may transfer web content such as images, text, video, audio, and the like, to the user device 120 where it may be accessed or displayed via the web browser.

Figure 2:
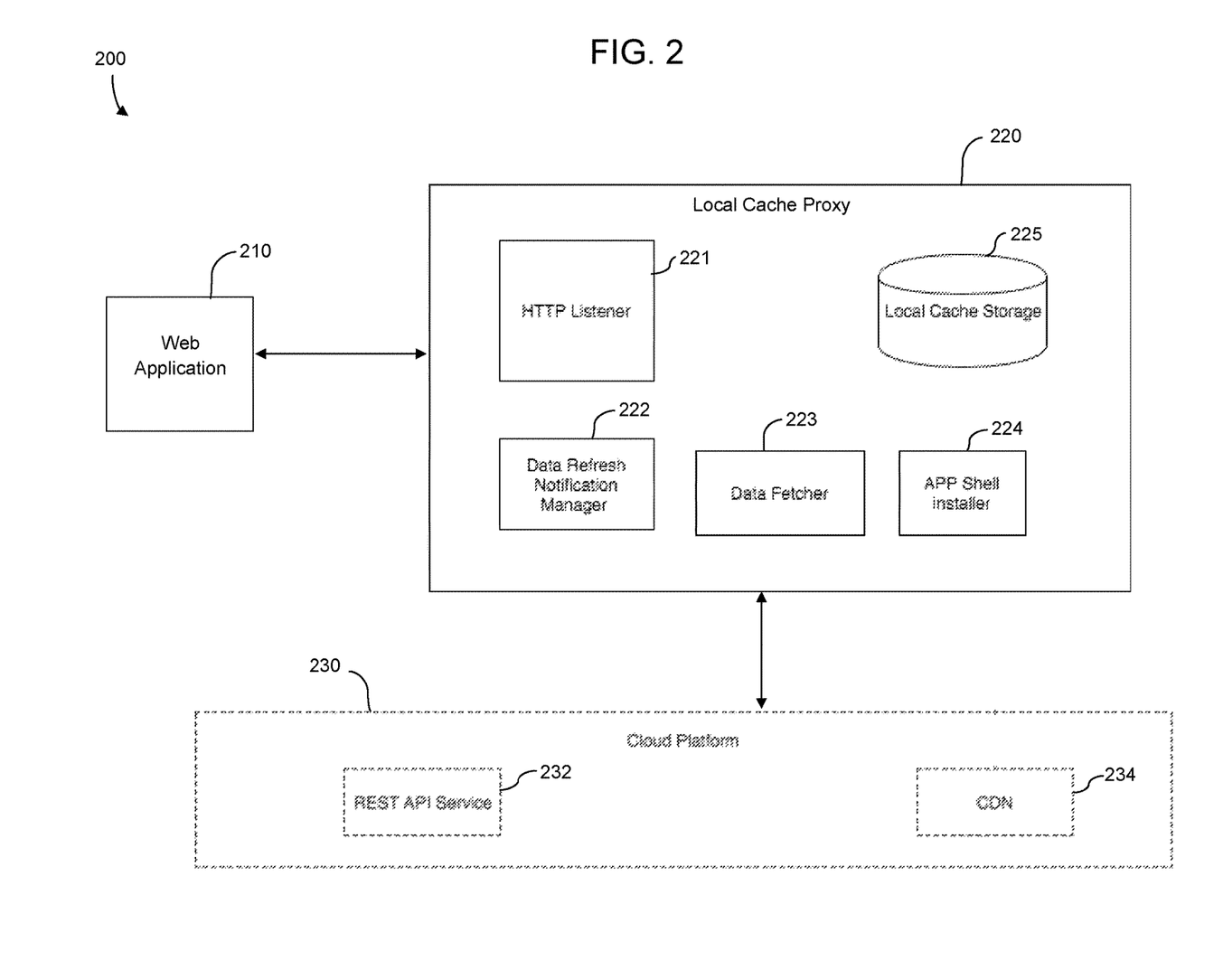
FIG. 2 is a diagram illustrating an example of a local cache proxy of a user device in accordance with an example embodiment.

FIG. 2 illustrates a system 200 for executing a progressive hybrid web application in accordance with another example embodiment. In this example, the system 200 includes a web application 210 and a local cache proxy 220. Here, the web application 210 may be executed within a web browser of the user device and the local cache proxy 220 may be included within the user device. The system 200 also includes a web server 230 which in this example is a cloud platform, however, the embodiments are not limited thereto. In some embodiments, both the web application 210 and the local cache proxy 220 may connect directly with the web server 230 for transmission of web data. As another example, the web application 210 may communicate indirectly with the web server 230 via the local cache proxy 220. The web application 210 may include one or more web views which may be embedded within the web browser running on the user device and which may be used to access a web platform or other network entity capable of providing web pages and web content. As a non-limiting example, a web view may be Apple WKWebView provided by Apple, Inc., however, embodiments are not limited thereto. The web view may include an object that displays interactive web content of the web application 210, such as for an in-app browser. The web content of the web application 210 may include static web content and dynamic web content stored by the web server 230 or another external source.

In the example of FIG. 2, the local cache proxy 220 may be stored locally on the user device and may act as an intermediate between the web application 210 and the web server 230. For example, the local cache proxy 220 may be capable of intercepting network calls and other requests transmitted by the web application 210 and intended for the web server 230. The local cache proxy 220 may be a web-based proxy that facilitates access to web content that is stored on the web server 230 or some other device. A request such as an HTTP request that is sent from the web application 210 via the world wide web may be captured by the local cache proxy 220 and managed as further described herein.

In this example, the local cache proxy 220 includes an HTTP listener 221, a data refresh notification manager 222, a data fetcher 223, an app shell installer 224, and a local cache storage 225. Although not shown, the local cache proxy 220 may include or may otherwise be controlled by a processing device that is capable of controlling each of the components of the local cache proxy 220. In operation, the HTTP listener 221 may intercept an HTTP request sent from the web application 210 to the web server 230 and divert the HTTP request to the data fetcher 223 of the cache proxy 220. The data fetcher 223 may acquire web content from the local cache storage 225, if it exists, and send the results to the HTTP listener 221 or directly to the web application 210. In addition, the data fetcher 223 may send the web request to remote web sources such as the web server 230 and receive updated web content associated with the web application 210 stored on the web server 230. In response, the data fetcher 223 can compare the updated content with the web content of the web application 210 currently saved in the local cache storage 225, determine the web content has been updated, and update the local cache storage 225 with the updated content. In addition, when there is no network connection, the data fetcher 223 can rely on the data stored in the local cache storage 225 thereby still providing interactive web content to the web application 230 even though there is no network connection with the web server 230 hosting the web application 210.

In some examples, the data refresh notification manager 222 may receive a notification from the data fetcher 223 indicating that the local cache storage 225 has been updated with web content of the web server 230. In response, the data refresh notification manager 222 may refresh a web view of the web application 210 on the user device to include the updated content. The app shell installer 224 can fetch static application content associated with the web application 210 stored on the web server 230, and save the static application content in the local cache storage 225 prior to or during execution of the web application 210. For example, the static application content may include metadata, cascading style sheets (CSS), static HTML, images, and the like. Meanwhile, the local cache storage 225 can store static content of the web application 210 as well as dynamic updated content of the web application 210.

In some embodiments, when the web application 210 is launched in the web browser of the user device, the app shell installer 224 may obtain the static application content from a content distribution network or content delivery network (CDN) 234 included within the web server 230 via a secure exchange. The app shell installer 224 may save the static web content in the local cache storage 225. When the web application 210 requests web content to be loaded, for example, when the web application 210 transmits a mobile-Loader.html request, the HTTP listener 221 may receive the request to load the content and forward the request to the data fetcher 223. In response, the data fetcher 223 may fetch the content/data included in the mobileLoader.html request from the local cache storage 225, and transfer the fetched content to the HTTP listener 221 which forwards the content to the web application 210.

As another example, the web application 210 may also request additional web content, for example, based on a user interaction, an event occurring, a time, etc. According to various embodiments, the web application 210 may transmit a representational state transfer (REST) application programming interface (API) request to the web server 230 which is intercepted by the cache proxy 220 (e.g., the HTTP listener 221). The HTTP listener 221 may forward the REST API request to the data fetcher 223, and the data fetcher 223 may attempt to obtain the content included in the request from the local storage 225. However, if the local cache storage 225 does not have the requested web content, the data fetcher 223 may request the content from REST API service 232 included in the web server 230. In response to receiving the content from the REST API service 232, the web fetcher 223 can provide the content to the local cache storage 225 for storing, and also provide the content to the HTTP listener 221 where it can be forwarded to the web application 210.

As another example, if the requested web content is present in the local cache storage 225, the data fetcher 223 may send the REST API data to the HTTP listener 221 and the web content may be transferred to the web application 210. In addition, in this example, the data fetcher 223 may perform an additional check by transmitting the REST API request to a REST API service 232 included within the web server 230. Here, the REST API service 232 can deliver the related content and the web fetcher 223 may compare the content received from the REST API service 232 with the corresponding content stored in the local cache storage 225 and determine whether an update is needed. If the content returned from the REST API service 232 is the same as the content stored in the local cache storage 225, no update is performed. However, if the content has changed, the web fetcher 223 may control the local cache storage 225 to update the content. Furthermore, the web fetcher 223 may send the updated content to the data refresh notification manager 222, and the data refresh notification manager 222 can update a web view of the web application 210 based on the updated content/data. As a result, the web fetcher 223 may at least obtain most recent content from the local cache storage 225 (if a network connection is not available), and when subsequently connected to the network, also guarantee the most up-to-date content from the web server 230.

Figure 3:
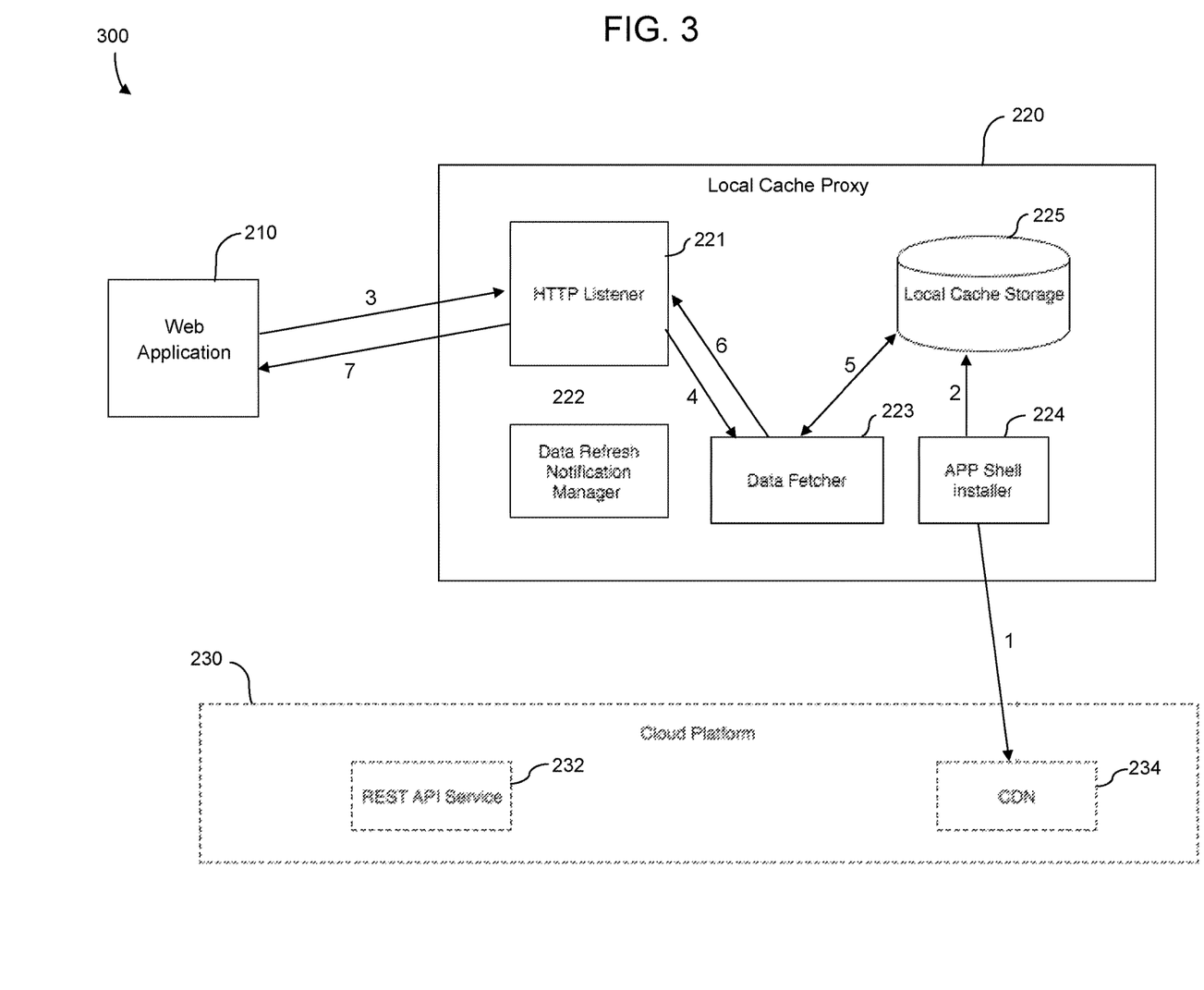
FIGS. 3-7 are diagrams illustrating web content retrieval processes performed by a local cache proxy in accordance with various example embodiments.

FIG. 3 illustrates a process 300 of initially loading web content at a time of launching the web application in accordance with an example embodiment. Referring to FIG. 3, when a web application is launched, the app shell installer 224 fetches web content for the application from the content delivery network 234. Here, the fetched content may be static content of the web application. In a second step, the app shell installer 224 saves the static web content in the local cache storage 225. In a third step which may be unrelated to the first two steps, the web application 210 issues a network call or a network request for web content (e.g., mobileLoader.html). The network request is heard by the HTTP listener 221, and in a fourth step, the network request is forwarded to the data fetcher 223. The data fetcher 223 then fetches the web content identified by the network request from the local cache storage 225 and returns the web content to the HTTP listener 221. In a seventh step, the web content is provided to the web application 210.

Figure 4:
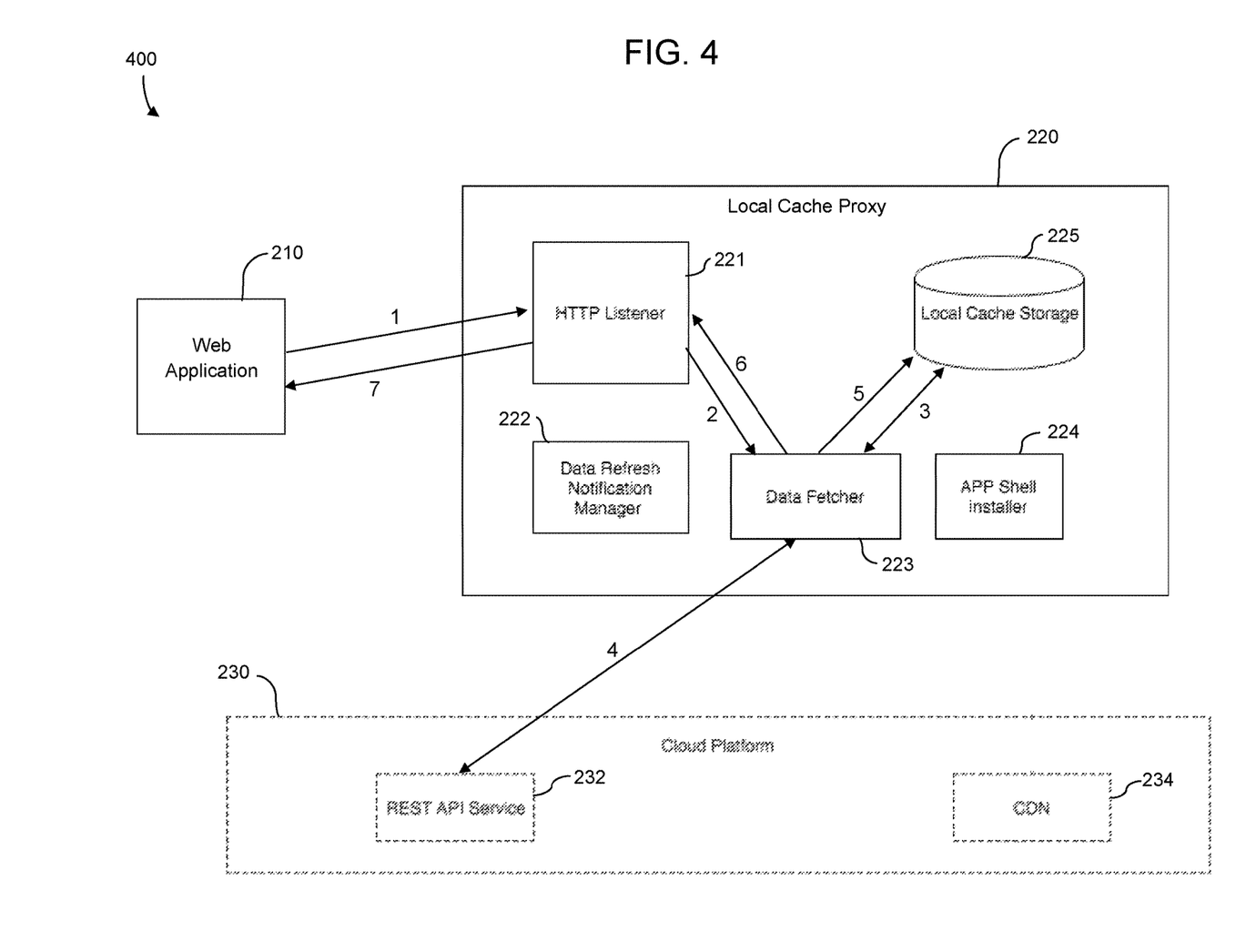

FIG. 4 illustrates a process 400 of loading web content from a remote web server in accordance with an example embodiment. Referring to FIG. 4, in a first step, the web application 210 issues a network request for web content which is heard by the HTTP listener 221. In a second step, the HTTP Listener 221 forwards the network request to the data fetcher 223. The data fetcher 223 then attempts to fetch the web content identified by the network request from the local cache storage 225 but is unsuccessful. Accordingly, in a fourth step, the data fetcher 223 request and receives the web content from the REST API service 232 of the web server 230. Accordingly, dynamic web content and updated static web content can be retrieved from the REST API service 232. In a fifth step the data fetcher 223 stores the retrieved REST API web content from the web server 230 in the local cache storage 225 and forwards the web content to the HTTP listener 221, in the sixth step. In a seventh step, the HTTP listener 221 forward the web content from the REST API service 232 of the web server 230 to the web application 210 (e.g., a web view of the web application).

Figure 5:
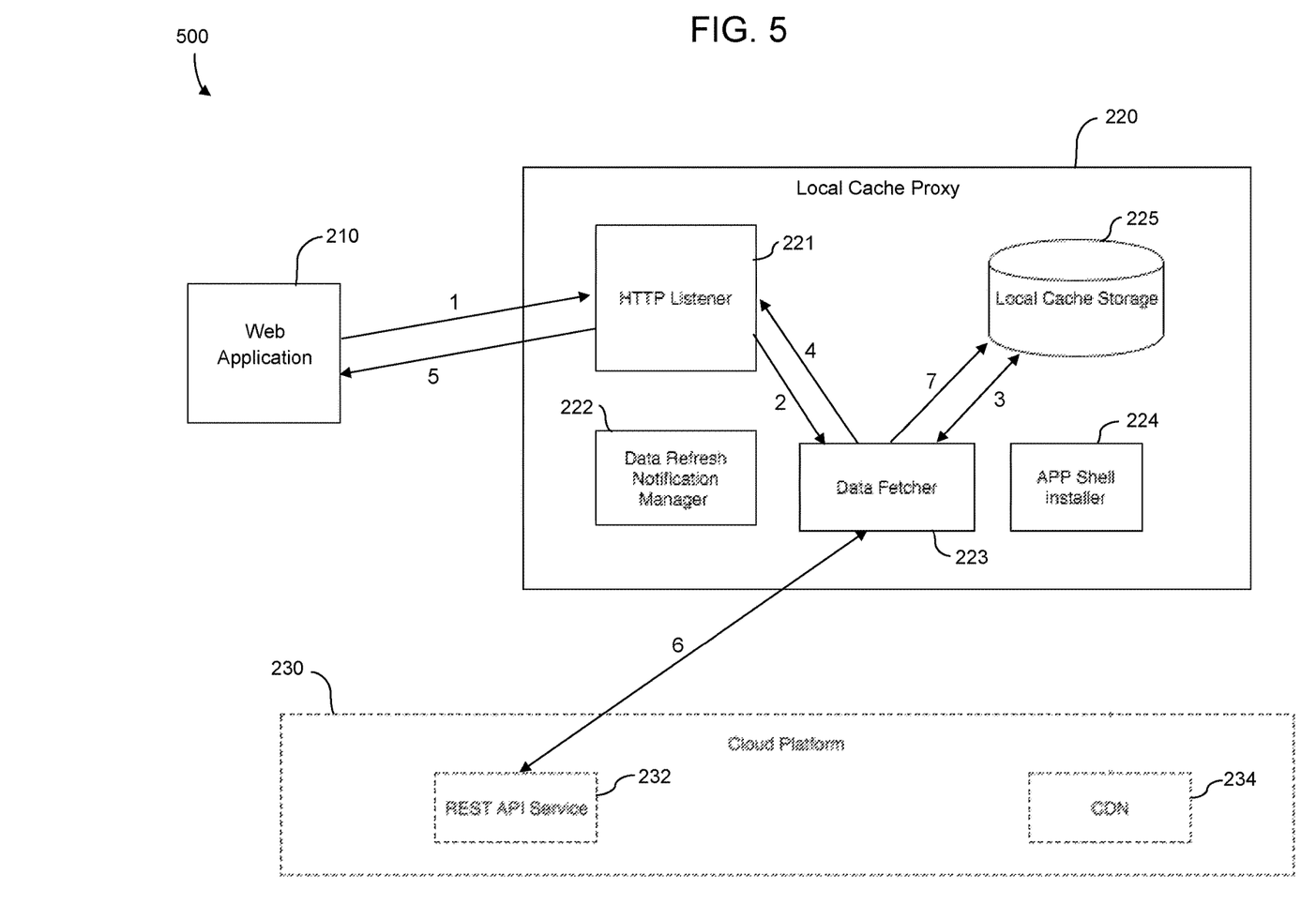

FIG. 5 illustrates a process 500 of loading web content from both a local cache storage and a remote web server in accordance with an example embodiment. Referring to FIG. 5, in a first step, the web application 210 issues a network request for web content which is heard by the HTTP listener 221. In a second step, the HTTP Listener 221 forwards the network request to the data fetcher 223. Next, the data fetcher 223 fetches the web content identified by the network request from the local cache storage 225. In this example, the requested web content is stored in the local cache storage 225. Accordingly, in a fourth step the fetched web content from the local cache storage 225 is forward to the HTTP listener 221, where it is forwarded to the web application 210 in a fifth step. In addition, in the example of FIG. 5, the data fetcher 223 also sends a request for web content from the web server 230 (e.g., the REST API service 232) and receives the request web content from the web server 230. Here, the sixth step may be performed at the same time as the third step, or it may be performed at a different subsequent time such as when a network connection is restored.

Figure 6:
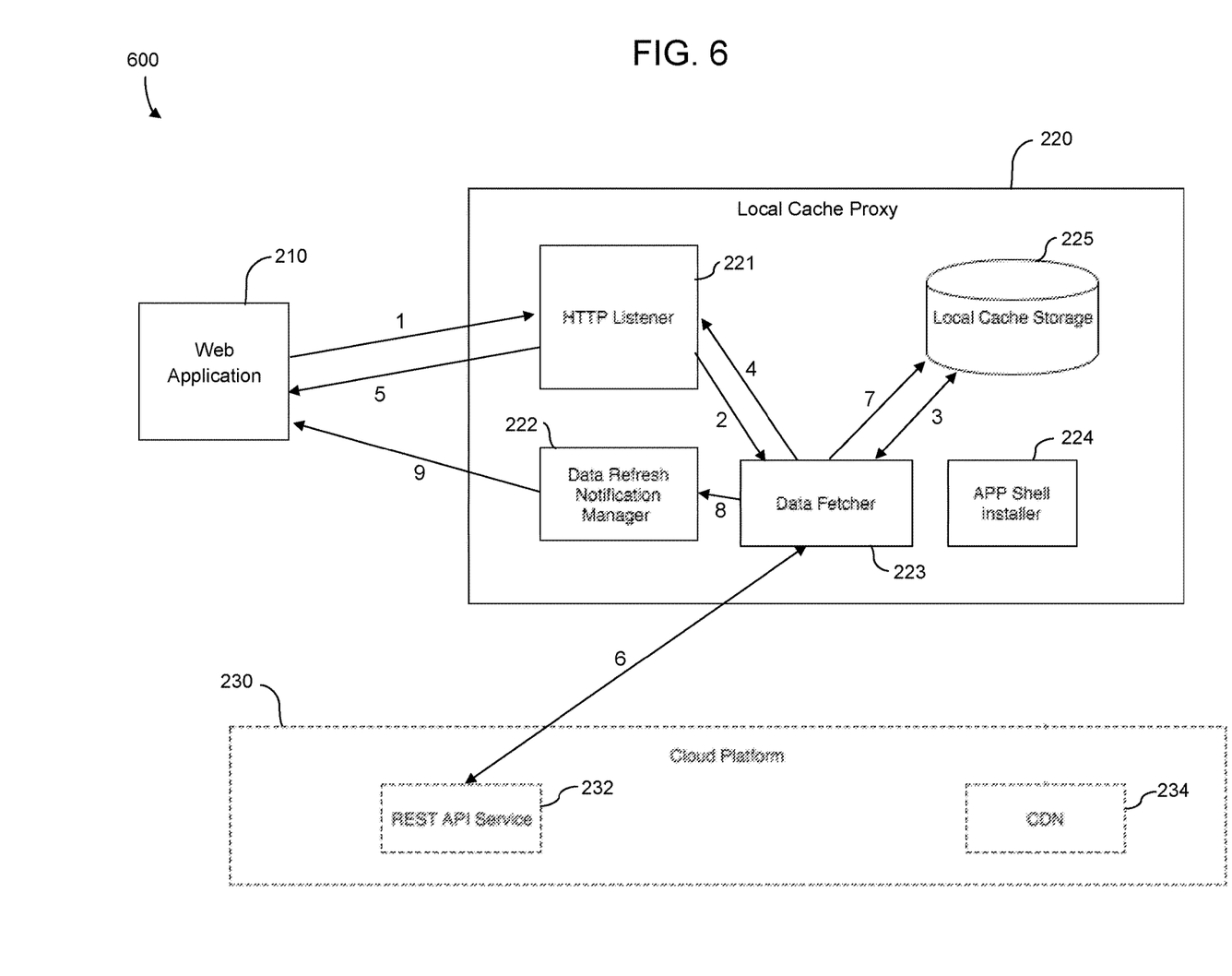

In a seventh step of process 500 of FIG. 5, the data fetcher 223 compares the web content received from the web server 230 with the web content stored by the local cache storage 225. In the example of FIG. 5, the web content is the same. Accordingly, the process 500 ends. However, process 600 of FIG. 6 further illustrates steps eight and nine which may occur when, in step seven, the data fetcher 223 determines that the web content received from the web server 230 is different than the web content stored by the local cache storage 225. In particular, in the seventh step of FIG. 6, the data fetcher 223 determines that the web content needs to be updated, and stores the updated content at the local cache storage 225. In addition, the data fetcher 223 sends an update to the data refresh notification manager 222 indicating that updated web content for the web application is included within the update, and the data refresh notification manager 222 forwards the updated web content to the web application 210, in a ninth step. In this example, the web application 210 can be initially started based on web content stored in the local cache storage 225 (e.g., when network connectivity is poor) and both the local cache storage 225 and the web application 210 can be updated with web content from the web server 230 at a later time (e.g., when network connectivity is restored).

Figure 7:
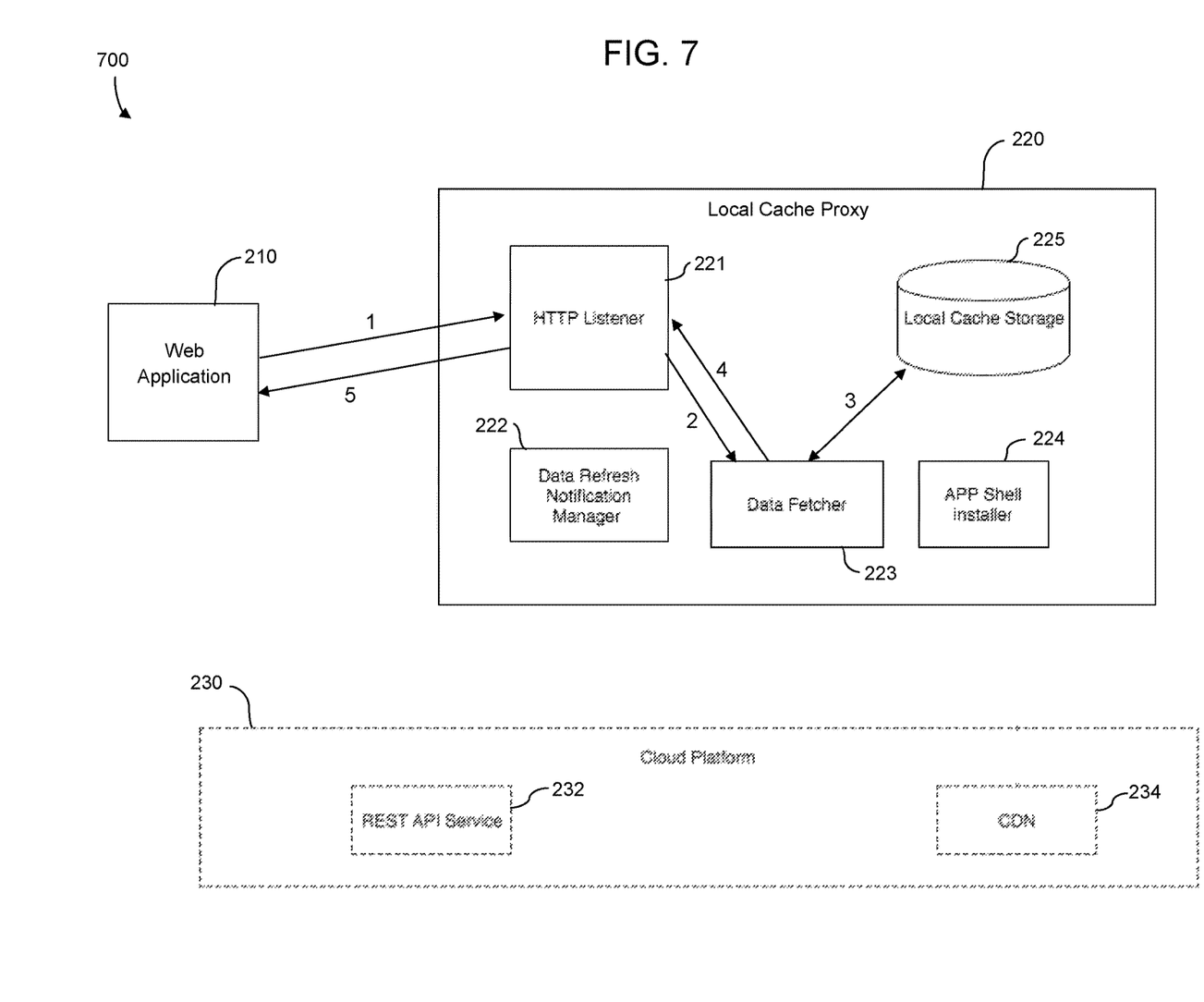

FIG. 7 illustrates a process 700 of loading web content when there is no network connection between the user device executing the web application 210 and the web server 230 hosting the web application 210. In this example, the web application 210 may transmit a REST API request which is detected or otherwise received by the HTTP listener 221. In a second step, the HTTP listener 221 forwards the intercepted REST API request to the web fetcher 223. In this example, in steps 3, 4, and 5, the web fetcher 223 can retrieve the most recent web content associated with the REST API request that has been previously stored by the local cache storage 225 and return the web content to the web application 210, even though no network connection exists. As a result, the web application can still provide interactive web content without a network connection.

Figure 8:
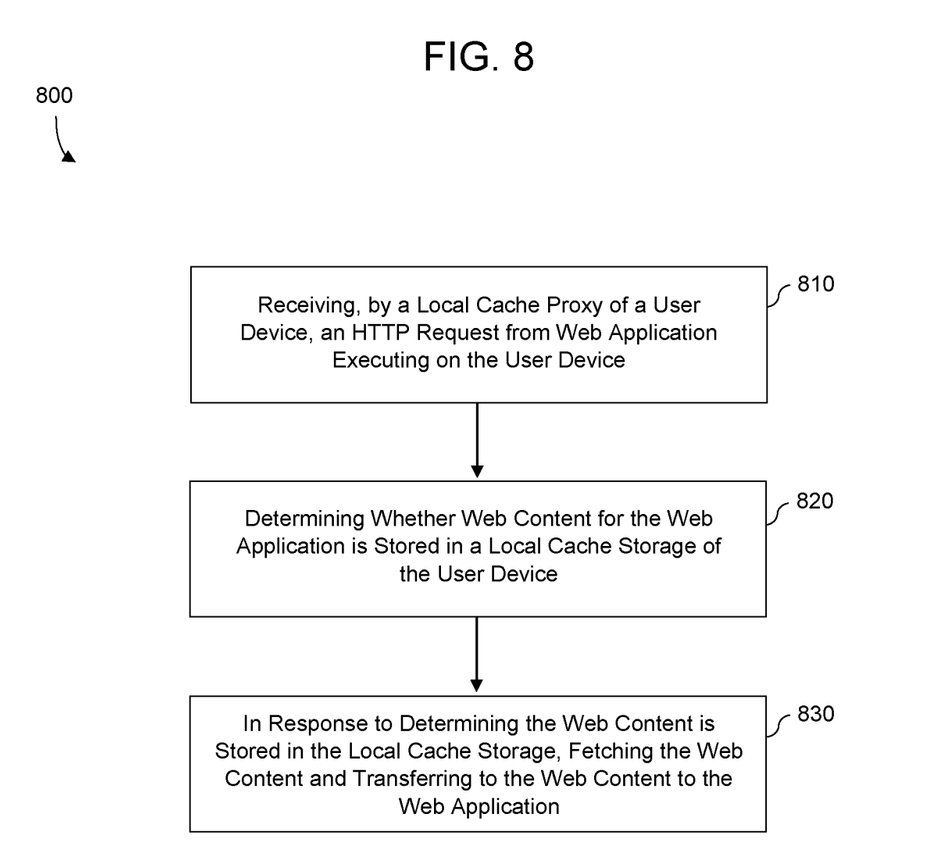
FIG. 8 is a diagram illustrating a method for managing a hybrid web application in accordance with an example embodiment.

FIG. 8 illustrates a method 800 for managing a hybrid web application in accordance with an example embodiment. For example, the method 800 may be performed by the local cache proxy 120 shown in FIG. 1 which may be included in a user device. As another example, the method 800 may be performed by another device or combination of devices. Referring to FIG. 8, in 810, the method includes receiving an HTTP request from a web application executing on the user device. The web application may be controlled by a remote web server that hosts the web application. The user device may be connected to the remote web server via a network connection such as the Internet. Here, the HTTP request may include an identification of web content that is provided by the remote web server and which the web application needs to execute. In some cases, the HTTP request may be transmitted directly to the local cache proxy. As another example, the HTTP request may be intended for the remote web server and be intercepted by the local cache proxy. The HTTP request may include a REST API request.

In 820, the method includes determining whether the requested web content included in the HTTP request is stored in a local cache storage of the user device. For example, the local cache proxy may intercept or otherwise receive the HTTP request and first determine whether the web content is stored locally within the user device rather than sending the request across the network to the remote web server. For example, prior to receiving the HTTP request, the local cache proxy may periodically or continuously load web content of the web application from the remote web server when the user device is connected to the network. As one example, the cache proxy may load static application web content from a content delivery module of the remote web server in response the web application being started on the user device. The local cache proxy may fetch static web content of the web application from the remote web server and store the static web content in the local cache storage, prior to receiving the HTTP request from the web application. The data stored in the local cache storage may be updated each time new data is received from the remote web server based on requests from the web application executing on the user device or based on automated requests from the local cache proxy even in situations where the web application does not request web content.

In response to determining the web content associated with the HTTP request is stored in the local cache storage, in 830 the method includes fetching the web content from the local cache storage and transferring the fetched web content to the web application. Here, the web content is fetched from a local storage instead of from a remote web server resulting in a faster and more reliable delivery of web content. In some embodiments, the fetching by the local cache proxy may include loading the web content from the local cache storage in response to the user device being disconnected from the remote web server. As another example, the fetching by the local cache proxy may include loading the web content from the local cache storage regardless of whether the user device is connected or is not connected to the remote web server via a network. In some embodiments, although not shown in FIG. 8, the method may further include the local cache proxy transmitting the HTTP request to a REST API service of the remote web server, receiving updated web content from the REST API service, and determining that the web content stored in the local cache storage is to be updated based on the updated web content received from the REST API service. Accordingly, the local cache proxy may update the local cache storage to include the updated web content stored by the REST API service, and transmit a refresh command to the web application to update a web view associated with the web content.

Figure 9:
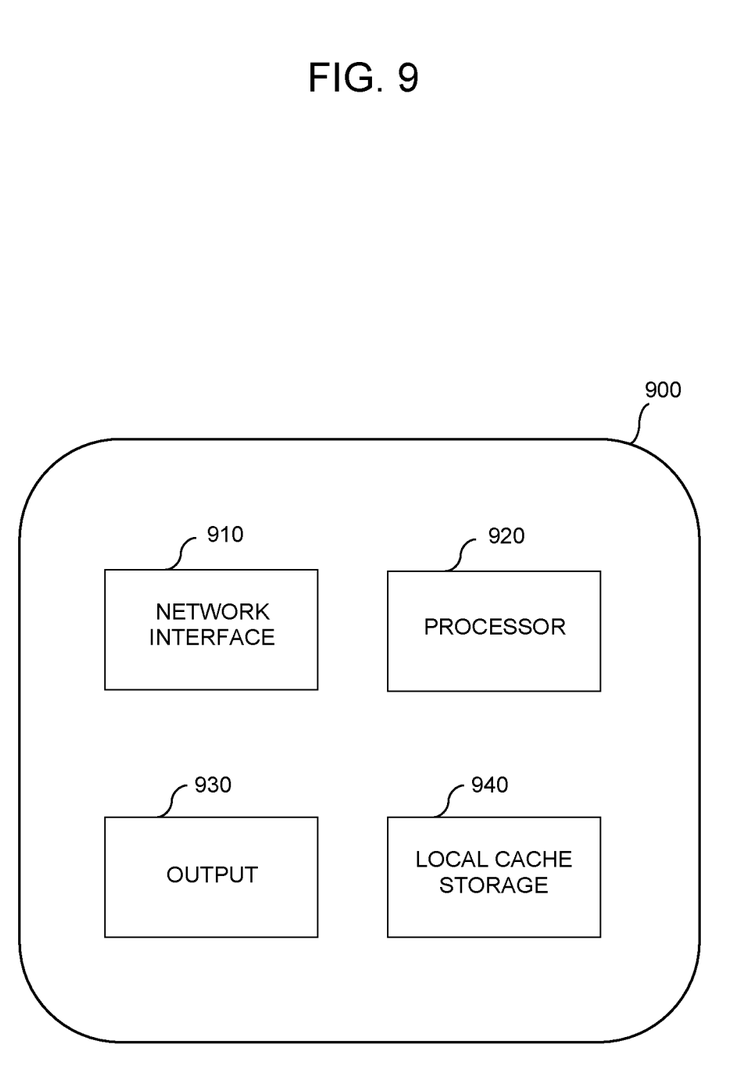
FIG. 9 is a diagram illustrating a computing system for managing a hybrid web application in accordance with an example embodiment.

FIG. 9 illustrates a computing system 900 for managing a hybrid web application in accordance with an example embodiment. For example, the computing system 900 may be the user device 120 of FIG. 1, or another device. Also, the computing system 900 may perform the method of FIG. 8. Referring to FIG. 9, the computing system 900 includes a network interface 910, a processor 920, an output 930, and a local storage device 940. Although it is not shown in FIG. 9, the computing system 900 may include other components such as a display, an input unit, a receiver/transmitter, and the like. The network interface 910 may transmit and receive data over a network such as the Internet, a private network, a public network, and the like. The network interface 910 may be a wireless interface, a wired interface, or a combination thereof. The processor 920 may include one or more processing devices each including one or more processing cores. In some examples, the processor 920 is a multicore processor or a plurality of multicore processors. Also, the processor 920 may be fixed or it may be reconfigurable. The output 930 may output data to an embedded display of the computing system 900, an externally connected display, a cloud, another device, and the like. For example, the output 930 may output a display of a web application executed by the processor 920 based on remote web content stored in the local cache storage 940. The local cache storage 940 is not limited to any particular storage device and may include any known memory device.

The network interface 910 may communicate, via a network, with a remote web server that hosts a web application. The processor 920 may execute the web application hosted by the remote web server and the output 930 may output a visual representation, user interface, window, etc., as a result of the processing of the web application. According to various embodiments, the processor 920 (or a local cache proxy controlled by the processor 920) may receive a hyper-text transfer protocol (HTTP) request from the web application which includes a request for web content of the remote web server. In response, the processor 920 may determine whether the requested web content included in the HTTP request is stored in the local cache storage 940. If the web content associated with the HTTP request is stored in the local cache storage 940, the processor 920 may fetch the web content from the local cache storage 940 and transfer the fetched web content to the web application. On the other hand, if the web content is not stored in the local cache storage 940, the processor 920 may send a request to the remote web server for the web content. In this case, the processor 920 can receive the web content from the remote web server and store the received web content in the local cache storage 940. In some embodiments, even if the web content is stored in the local cache storage 940, the processor may determine whether updated content is available from the remote web server, request the updated web content, and update that the web content that is stored in the local cache storage 940.

The processor 920 may load the web content from the local cache storage 940 in response to the network interface 910 being disconnected from the remote web server. As another example, the processor 920 may load the web content from the local cache storage 940 regardless of whether the network interface 910 is connected to the remote web server via a network. In some embodiments, the HTTP request may include a REST API request that is intended for the remote web server and which is intercepted by the processor 920. In some embodiments, the processor 920 may load static application web content from a content delivery module of the remote web server in response the web application being started and prior to receiving the HTTP request from the web application. In this example, the processor 920 may fetch static web content of the web application from the remote web server and store the static web content in the local cache storage 940.

As will be appreciated based on the foregoing specification, the above-described examples of the disclosure may be implemented using computer programming or engineering techniques including computer software, firmware, hardware or any combination or subset thereof. For example, the methods described herein may be implemented via one or more software applications (e.g., program, application, code, module, service, etc.) executing on one or more computing devices. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method of a local cache proxy of a user device for managing a hybrid web application, the method comprising:
   fetching, via an application shell installer, static application content comprising web content associated with the hybrid web application stored on a remote web server;
   storing, via the application shell installer, the static application content in a local cache storage of the local cache proxy;
   intercepting a network call, after the fetching of the static application content via the application shell installer, the network call comprising a hyper-text transfer protocol (HTTP) request issued by a web application executing on the user device, the HTTP request including a request for the web content of the remote web server;
   determining, by the user device, whether the requested web content included in the HTTP request is stored in the local cache storage within the user device;
   fetching static web content of the web application from the remote web server and storing the static web content in the local cache storage, prior to receiving the HTTP request from the web application, wherein the static application content includes at least one of metadata, cascading style sheets (CSS), static HTML, or at least one image;
   transmitting the HTTP request to a REST API service of the remote web server, receiving updated web content from the REST API service, and determining that the web content stored in the local cache storage is to be updated based on the updated web content received from the REST API service;
   in response to determining the web content associated with the HTTP request is stored in the local cache storage:
      fetching the web content from the local cache storage,
      transferring the fetched web content to the web application,
      transmitting a request to the remote web server, and
      in response to receiving the web content from the remote server and determining, by the user device, that the received web content is different from the web content stored in the local cache storage of the user device, updating the web content stored in the local cache and transmitting, by the user device, a refresh notification to the web application to initiate an update to the web application based on the updating of the web content; and
   in response to determining that the web content associated with the HTTP request is not stored in the local cache storage within the user device, transmitting the HTTP request to the remote web server.

2. The method of claim 1, wherein the fetching by the local cache proxy comprises loading the web content from the local cache storage in response to the user device being disconnected from the remote web server.

3. The method of claim 1, wherein the fetching by the local cache proxy comprises loading the web content from the local cache storage regardless of whether the user device is connected to the remote web server via a network.

4. The method of claim 1, further comprising updating the local cache storage to include the updated web content stored by the REST API service, and transmitting a refresh command to the web application to update a web view associated with the web content.

5. The method of claim 1, wherein the HTTP request comprises a REST API request that is intended for the remote web server and which is intercepted by an HTTP listener of the local cache proxy.

6. The method of claim 1, further comprising loading, by the local cache proxy, static web content from a content delivery module of the remote web server in response the web application being started.

7. A computing system comprising:
a local cache storage;
a network interface configured to communicate, via a network, with a remote web server that hosts a web application;
an application shell installer to fetch static application content comprising web content associated with a web application stored on a remote web server and store the static application content in the local cache storage; and
a processor configured to execute the web application hosted by the remote web server, wherein the processor is configured to receive a hyper-text transfer protocol (HTTP) request from the web application which includes a request for web content of the remote web server, determine whether the requested web content included in the HTTP request is stored in the local cache storage, fetch static web content of the web application from the remote web server and store the static web content in the local cache storage, prior to receiving the HTTP request from the web application, wherein the static application content includes at least one of metadata, cascading style sheets (CSS), static HTML, or at least one image, and transmit the HTTP request to a REST API service of the remote web server, receiving updated web content from the REST API service, and determining that the web content stored in the local cache storage is to be updated based on the updated web content received from the REST API service,
in response to determining the web content associated with the HTTP request is stored in the local cache storage:
fetch the web content from the local cache storage, transfer the fetched web content to the web application,
transmit a request to the remote web server, and
in response to receiving the web content from the remote server and determining that the received web content is different from the web content stored in the local cache storage, updating the web content stored in the local cache and transmitting a refresh notification to the web application to initiate an update to the web application based on the updating of the web content; and
in response to determining that the web content associated with the HTTP request is not stored in the local cache storage, transmitting the HTTP request to the remote web server.

8. The computing system of claim 7, wherein the processor is configured to load the web content from the local cache storage in response to the network interface being disconnected from the remote web server.

9. The computing system of claim 7, wherein the processor is configured to load the web content from the local cache storage regardless of whether the network interface is connected to the remote web server via a network.

10. The computing system of claim 7, wherein the processor is further configured to transmit the HTTP request to a REST API service of the remote web server, receive updated web content from the REST API service, and determine that the web content stored in the local cache storage is to be updated based on the updated web content received from the REST API service.

11. The computing system of claim 10, wherein the processor is further configured to update the local cache storage to include the updated web content stored by the REST API service, and transmit a refresh command to the web application to update a web view associated with the web content.

12. The computing system of claim 7, wherein the HTTP request comprises a REST API request that is intended for the remote web server and which is intercepted by the processor.

13. The computing system of claim 7, wherein the processor is further configured to load static web content from a content delivery module of the remote web server in response the web application being started.

14. A non-transitory computer readable medium having stored therein instructions that when executed cause a computer to perform a method of a local cache proxy of a user device for managing a progressive hybrid web application, the method comprising:
fetching static application content comprising web content associated with the progressive hybrid web application stored on a remote web server;
storing the static application content in a local cache storage of the local cache proxy;
intercepting a network call, after the fetching of the static application content via the application shell installer, the network call comprising a hyper-text transfer protocol (HTTP) request issued by a web application executing on the user device, the HTTP request including a request for the web content of the remote web server;
determining whether the requested web content included in the HTTP request is stored in the local cache storage of the user device;
fetching static web content of the web application from the remote web server and storing the static web content in the local cache storage, prior to receiving the HTTP request from the web application, wherein the static application content includes at least one of metadata, cascading style sheets (CSS), static HTML, or at least one image;
transmitting the HTTP request to a REST API service of the remote web server, receiving updated web content from the REST API service, and determining that the web content stored in the local cache storage is to be updated based on the updated web content received from the REST API service;

in response to determining the web content associated with the HTTP request is stored in the local cache storage:
   fetching the web content from the local cache storage,
   transferring the fetched web content to the web application,
   transmitting a request to the remote web server, and
   in response to receiving the web content from the remote server and determining that the received web content is different from the web content stored in the local cache storage, updating the web content stored in the local cache and transmitting a refresh notification to the web application to initiate an update to the web application based on the updating of the web content; and
in response to determining that the web content associated with the HTTP request is not stored in the local cache storage, transmitting the HTTP request to the remote web server.

15. The non-transitory computer-readable medium of claim 14, wherein the fetching by the local cache proxy comprises loading the web content from the local cache storage regardless of whether the user device is connected to the remote web server.

16. The non-transitory computer-readable medium of claim 14, wherein the method further comprises transmitting the HTTP request to a REST API service of the remote web server, receiving updated web content from the REST API service, and determining that the web content stored in the local cache storage is to be updated based on the updated web content received from the REST API service.

* * * * *